US008388857B2

(12) United States Patent
Elsheikh et al.

(10) Patent No.: US 8,388,857 B2
(45) Date of Patent: Mar. 5, 2013

(54) STABILIZED HYDROCHLOROFLUOROOLEFINS AND HYDROFLUOROOLEFINS

(75) Inventors: Maher Y. Elsheikh, Wayne, PA (US); Philippe Bonnet, Lower Merion, PA (US); Benjamin Bin Chen, Wayne, PA (US); Brett L. Van Horn, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 164 days.

(21) Appl. No.: 12/664,200

(22) PCT Filed: Jun. 27, 2008

(86) PCT No.: PCT/US2008/068560

§ 371 (c)(1), (2), (4) Date: Dec. 11, 2009

(87) PCT Pub. No.: WO2009/003165

PCT Pub. Date: Dec. 31, 2008

(65) Prior Publication Data

US 2010/0181524 A1 Jul. 22, 2010

Related U.S. Application Data

(60) Provisional application No. 60/946,410, filed on Jun. 27, 2007.

(51) Int. Cl.
*C09K 5/00* (2006.01)

(52) U.S. Cl. ............ 252/67; 252/68; 570/102; 570/239

(58) Field of Classification Search ........................ None
See application file for complete search history.

(56) References Cited

U.S. PATENT DOCUMENTS 4,323,528 A 4/1982 Collins
7,026,520 B1 4/2006 Mukhopadhyay
2005/0198958 A1 9/2005 Haase
2006/0022166 A1 2/2006 Wilson et al.
2006/0106263 A1 5/2006 Miller et al.
2006/0142173 A1* 6/2006 Johnson et al. ............... 510/407

* cited by examiner

*Primary Examiner* — Necholus Ogden, Jr.
(74) *Attorney, Agent, or Firm* — Steven D. Boyd

(57) ABSTRACT

Disclosed is a combination of hydrofluoroolefins and/or hydrochlorofluoroolefins with stabilizers wherein the stabilizers minimize the degradation of the hydrofluoroolefins and hydrochlorofluoroolefins during storage, handling and use yet allow for atmospheric degradation. The combinations exhibit low or zero ozone depletion potential and lower global warming potential making them of interest as replacements for chlorofluorocarbons and hydrfluorocarbons. The combinations of the present invention comprise hydrofluoroolefins and/or hydrochlorofluoroolefins in combination with a stabilizer or stabilizers selected from free radical scavengers, acid scavengers, oxygen scavengers, polymerization inhibitors and combinations thereof.

6 Claims, No Drawings

STABILIZED HYDROCHLOROFLUOROOLEFINS AND HYDROFLUOROOLEFINS

FIELD OF THE INVENTION

The present invention relates to stabilized hydrochlorofluoroolefin and hydrofluoroolefin compositions wherein the composition comprises a fluoroolefin and at least one stabilizing component. The compositions of the present invention are useful in processes for producing cooling or heat, as heat transfer fluids, foam blowing agents, aerosol propellants, fire suppression, extinguishing agents and solvent applications.

BACKGROUND OF THE INVENTION

The Montreal Protocol for the protection of the ozone layer, signed in October 1987, mandate the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change. The emerging replacement materials, hydrofluoropropene, were shown to be environmentally acceptable ie has zero ozone depletion potential (ODP) and low global warming potential (GWP), much less than 150.

Currently proposed replacement refrigerants for hydrofluorocarbons such as HFC-134a include HFC-152a, pure hydrocarbons such as butane or propane, or "natural" refrigerants such as $CO_2$. Many of these suggested replacements are, flammable, and/or have low energy efficiency. Therefore, new alternative refrigerants are being sought. Fluoroolefin materials such as hydrofluoropropene and/or hydrochlorofluoropropene have generated interest as replacements for HFCs. The inherent chemical instability of these materials in the lower atmosphere provides the low global warning potential and zero or near zero ozone depletion properties desired. However, such inherent instability is believed to also impact the commercial application of such materials which will degrade during storage, handling and use.

The object of the present invention is to provide novel compositions that can serve as refrigerant and heat transfer fluids as well as blowing agents, solvent cleaners, aerosol propellant, fire fighting agent. etc. that provide unique characteristics to meet the demands of low or zero ozone depletion potential and lower global warming potential as compared to the current HFCs.

SUMMARY OF THE INVENTION

The present invention is directed toward combinations of hydrofluoroolefins and/or hydrochlorofluoroolefins with stabilizers wherein the stabilizers minimize the degradation of the hydrofluoroolefins and hydrochlorofluoroolefins during storage, handling and use yet allow for the atmospheric degradation that results in low or zero ozone depletion potential and lower global warming potential. The combinations of the present invention comprise hydrofluoroolefins (HFO) and/or hydrochlorofluoroolefins (HCFO) in combination with a stabilizer selected from free radical scavengers, acid scavengers, oxygen scavengers, corrosion inhibitor, polymerization inhibitors and combinations thereof.

DESCRIPTION OF THE INVENTION

The present invention is directed towards combinations which provide hydrofluoroolefins (HFO) and/or hydrochlorofluoroolefins (HCFO) which are chemically stable during use, storage and transportation but will be degrade in the troposphere (tropodegradable). The inventive combination provides hydrofluoroolefins and/or hydrochlorofluoroolefins for use as heat transfer fluids, blowing agents, solvent cleaners for metal degreasing and dewatering, fire fighting agents and aerosol propellants, which exhibit a low global warming potential GWP (less than 150) and zero or near zero ozone depletion potential ODP. Hydrofluoroolefins and/or hydrochlorofluoroolefins have been proposed as heat transfer fluids as well as blowing agents, solvent cleaners etc. which exhibit a low global warming potential and a low ozone depletion value. Examples of linear hydrofluoroolefins and hydrochlorofluoroolefins include but not limited to: 1225ye E and Z isomers ($CF_3$—CF═CFH), 1234ze E and Z isomers ($CF_3$—CH═CHF), 1234yf ($CF_3$—CF═$CH_2$), 1233zd E and Z isomers ($CF_3$—CH═CHCl), 1233xf ($CF_3$—CCl═$CH_2$) and isomers of 1223za ($CF_3$—CH=$Cl_2$) and 1223xd ($CF_3$—Cl═CHCl E and Z) alone or in combination.

The low global warming potential and a low ozone depletion value are a result of the atmospheric degradation of the hydrofluoroolefins and/or hydrochlorofluoroolefins by reaction with the hydroxyl radical OH. in the lower troposphere. Equally important; is to maintain chemical stability of the proposed HFO and HCFO during actual applications. Because of the presence of alkene linkage it is expected that the HFOs and HCFOs will be chemically unstable, relative to processor HCFC or CFC. The inventors have discovered that HFOs such as 1234ze can eliminate HF to form trifluoropropyne, during the production of polystyrene foam (XPS) or polyurethane foam (PUR).

The present inventors have discovered that hydrofluoroolefins and/or hydrochlorofluoroolefins can be stabilized against degradation during use, storage and handling by the addition of a stabilizer or stabilizers selected from free radical scavengers, acid scavengers, oxygen scavengers, polymerization inhibitors, corrosion inhibitors and combinations thereof. The stabilizers of the present invention have minimal impact on the degradation of the hydrofluoroolefins and/or hydrochlorofluoroolefins when released into the atmosphere. Exemplary stabilizers include but are not limited to: 1,2-epoxybutane; glycidyl methyl ether; d,1-limonene; d,1-limonene oxide; 1,2-epoxy-2-methylpropane; nitromethane; diethylhydroxylamine; alpha-methylstyrene; isoprene; p-methoxyphenol; 3-mehoxyphenol; hydrazines; 2,6-di-t-butylphenol and hydroquinone.

The hydrofluoroolefin and/or hydrochlorofluoroolefin combinations of the present invention are tropodegradable while at the same time they provide chemical stability during use, storage and shipping. It is believed that the combinations provide "application" stability by controlling the formation of undesirable reactants such as oxygenated products, acids, radicals and corrosion initiators in the presence of active metals, oxygen containing compounds, moisture and during exposure to high temperatures and pressures. The level of the stabilizer component of the combination of the present invention can range from about 1 to 50,000 ppm, preferably about 100 ppm to 1000 ppm of the combination. The hydrofluoroolefins and/or hydrochlorofluoroolefins combinations have a zero or near zero ozone depletion value, a low (less than about 150) global warming potential, are non-flammable, non-toxic or of low toxicity. The stable hydrofluoroolefin and or hydrochlorofluoroolefins of the present invention can be used in various applications such as:

1. Mobil Air Conditions (MAC) and Other Refrigerant Applications:

A refrigerant must be chemically stable during the refrigeration cycle eg, (a) resistant to reaction with active metal in the system such as iron, aluminum and copper causing corrosion: (b) resistant to chemical reactions such as dimerization/polymerization or which generate corrosive acids such as HF and/or HCl under the operating pressure and temperature. Furthermore, a refrigerant must be soluble and compatible with refrigerant oil(s).

The hydrofluoroolefins and/or hydrochlorofluoroolefins with stabilizer combinations of the present invention have been found effective as replacements for high GWP refrigerant(s) in refrigeration, air-conditioning, or heat pump systems. Conventional high GWP refrigerants in such systems include materials such as R134a, R22, R245fa, R114, R236fa, R124, R410A, R407C, R417A, R422A, R507A, and R404A. The hydrofluoroolefins and/or hydrochlorofluoroolefins with stabilizer combinations of the present invention are effective working fluids in refrigeration, air-conditioning, or heat pump apparatus that uses, used or is designed to use conventional high GWP refrigerants.

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows: liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

As used herein, mobile refrigeration apparatus or mobile air-conditioning (MAC) apparatus refers to any refrigeration or air-conditioning apparatus incorporated into a transportation unit for the road, rail, sea or air. The present invention is particularly useful for road transport refrigerating or air-conditioning apparatus, such as automobile air-conditioning apparatus or refrigerated road transport equipment.

The hydrofluoroolefins and/or hydrochlorofluoroolefins with stabilizer combinations of the present invention may also be useful in stationary air-conditioning and heat pumps, e.g. chillers, high temperature heat pumps, residential and light commercial and commercial air-conditioning systems. In stationary refrigeration applications, the present compositions may be useful in equipment such as domestic refrigerators, ice machines, walk-in and reach-in coolers and freezers, and supermarket systems.

When used as refrigerants, the hydrofluoroolefin and/or hydrochlorofluoroolefin combinations of the present invention typically will include refrigeration lubricants, i.e. those lubricants suitable for use with refrigeration, air-conditioning, or heat pump apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems". Lubricants of the present invention may comprise those commonly known as "mineral oils" in the field of compression refrigeration lubrication. mineral oils comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins). Lubricants of the present invention further comprise those that have been designed for use with hydrofluorocarbon refrigerants and are miscible with refrigerants of the present invention under compression refrigeration, air-conditioning, or heat pump apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs). These lubricants are readily available from various commercial sources.

Lubricants of the present invention are selected by considering a given compressor's requirements and the environment to which the lubricant will be exposed. Commonly used refrigeration system additives may optionally be added, as desired, to compositions of the present invention in order to enhance lubricity and system stability. These additives are generally known within the field of refrigeration compressor lubrication, and include anti wear agents, extreme pressure lubricants, corrosion and oxidation inhibitors, metal surface deactivators, foaming and antifoam control agents, leak detectants and the like. In general, these additives are present only in small amounts relative to the overall lubricant composition. They are typically used at concentrations of from less than about 0.1% to as much as about 3% of each additive. These additives are selected on the basis of the individual system requirements. Some typical examples of such additives may include, but are not limited to, lubrication enhancing additives, such as alkyl or aryl esters of phosphoric acid and of thiophosphates. Additionally, the metal dialkyl dithiophosphates and other members of this family of chemicals may be used in compositions of the present invention. Other antiwear additives include natural product oils and assymetrical polyhydroxyl lubrication additives such as Synergol TMS (International Lubricants).

2. Blowing Agents

Thermoset foams such as rigid polyurethane foams can be prepared by mixing, under controlled conditions, MDI, polyols, blowing agents and additives i.e. catalysts, surfactants, water, and fire retardants. Different type of polyols can be used, typically in combination with polymeric MDI, and additives are typically preblended into the polyol. The formation of highly cross-linked homogeneous glassy network structure is essential for the final properties of the resulting foam. These properties include good heat stability, high compression strength at low density and good barrier properties.

In order to achieve optimum processing and end properties simultaneously a large number of formulations are required. One of key properties of rigid polyurethane foam is low thermal conductivity that is achieved by producing fine and closed-cell foam of the required density using water and a physical co-blowing agent. The physical blowing agent needs to have a low thermal conductivity as it stays in the cells and contributes to the level and stability of thermal conductivity of the foams.

For rigid polyurethane foam the initial exothermic reaction is normally between isocyanate and water, leading to the formation of am amine and carbon dioxide; the amine then reacts with more isocyanate to form polyurea. The other key exothermic reactions are between isocyanate and polyol, producing polyurethane and isocyanate trimerisation. Appropriate catalysts are selected for specific functions, such as, blowing, gelling and trimerisation to control the overall reaction rates and balance among them.

Once the isocyanate and polyol blend are thoroughly mixed there is normally a 30-fold increase in volume upon reaction and the formation of individual cell is related to the presence of nuclei in the mixture. Cell formation and stabilization are also related to the right surfactant. The rigid foam polymer structure becomes self-supporting once enough network formation has established.

The center of the foam can reach temperatures as high as 190° C. due to the exothermic reactions, however, the reaction are not completed at the end of foam rise and can go on for many hours. Similarly, it can several day for the center of the foam to completely cool down to ambient temperature.

The blowing agent combinations of the present invention can be used as a foaming agent for polyurethane foams by being mixed in a polyol mixture (typically referred to as the B side) which form foam when mixed with a polymeric MDI mixture (typically referred to as the A side).

For the production of thermoplastic foams, the preferred combinations of the present invention will have boiling points less than the melt and/or glass transition temperature of the polymer resin, typically less than about 100° C., preferably between about −40° C. to about 10° C.

The process for preparing a foamed thermoplastic product is as follows: Prepare a foamable polymer composition by blending together components comprising foamable polymer composition in any order. Typically, prepare a foamable polymer composition by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such azodicarbonamide or sodium bicarbonate and citric acid. IR attenuating agents and thermally insulating additives include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A semi-batch process involves preparing at least a portion of a foamable polymer composition and intermittently expanding that foamable polymer composition into a foam all in a single process. For example, U.S. Pat. No. 4,323,528, herein incorporated by reference, discloses a process for making polyolefin foams via an accumulating extrusion process. The process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner. For example, prepare a foamable polymer composition in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another.

In another embodiment, the present invention relates to blowing agent compositions comprising the hydrofluoroolefins and/or hydrochlorofluoroolefins with stabilizer combinations as described herein for use in preparing foams. In other embodiments the invention provides foamable compositions, and preferably polyurethane, polyisocyanate and thermoplastic foam compositions such as EPS and XPS foams, and method of preparing foams. In such foam embodiments, one or more of the present hydrofluoroolefins and/or hydrochlorofluoroolefins with stabilizer combinations are included as a blowing agent in foamable compositions, which composition preferably includes one or more additional components capable of reacting and foaming under the proper conditions to form a foam or cellular structure. Any of the methods well known in the art may be used or adapted for use in accordance with the foam embodiments of the present invention.

The present invention further relates to a method of forming a foam comprising: (a) adding to a foamable composition a hydrofluoroolefins and/or hydrochlorofluoroolefins with stabilizer combinations of the present invention; and (b) reacting the foamable composition under conditions effective to form a foam.

The hydrofluoroolefins and/or hydrochlorofluoroolefins of the present invention include open chain $C_2$, $C_3$ and $C_4$ hydrochlorofluoroolefins of the general formula $C_nH_{2n-a-b}F_aCl_b$ where n=3-8 and b=0-3 and a=0-14 and 2n is greater than a+b cyclic $C_3$ to $C_5$ hydrochlorofluoroolefins of the general formula $C_nH_{2n-2a-x-y}F_x\ Cl_y$ where n=3, 4 or 5, x=0-7, y=0-3, and a is the number of unsaturated double bonds, a=2n-2a≧x+y.

The stabilizing component of the hydrofluoroolefins and/or hydrochlorofluoroolefins with stabilizer combinations of the present invention comprise one or more free radical scavengers, acid scavengers, oxygen scavengers, polymerization inhibitors, corrosion inhibitors and combinations thereof.

Exemplary acid scavengers include but are not limited to 1,2-epoxy butane; glycidyl methyl ether; d,1-limonene oxide; 1,2-epoxy-2,2-methylpropane and nitroalkanes such as nitromethane. Exemplary oxygen scavengers include but are not limited to alpha methylsytrene and isoprene. Exemplary polymerization inhibitors include but are not limited to d,1-limonene and isoprene.

The linear hydrofluoroolefins and/or hydrochlorofluoroolefins compounds of the present invention can include HFC-1225ye, HFC-1234ze, HFC-1234yf, 1233zd, 1243zf, 1233xf, 1223za, 1223xd and the similar materials, according to the formula listed above for open chain and cyclic compounds. The hydrofluoroolefins and/or hydrochlorofluoroolefins may exist as different optical isomers or geometrical isomers. The present invention is intended to include all geometric isomers and optical isomers or any combination or mixture thereof. For instance, 1,3,3,3-tetra-fluoropropene (HFC-1234ze) is meant to represent the cis-isomer, trans-isomer, or any combination or mixture of both isomers in any ratio. Another example is HFC-1225ye, by which is represented the cis-isomer, trans-isomer, or any combination or mixture of both isomers in any ratio.

3. Aerosol Propellants:

Another embodiment of the present invention relates to the use of the hydrofluoroolefins and/or hydrochlorofluoroolefins with stabilizer combinations as described herein for use as propellants in sprayable compositions. Additionally, the present invention relates to a sprayable composition comprising the hydrofluoroolefins and/or hydrochlorofluoroolefins with stabilizer combinations as described herein. The active ingredient to be sprayed together with inert ingredients, solvents and other materials may also be present in a sprayable composition. Preferably, the sprayable composition is an aerosol. Suitable active materials to be sprayed include, without limitations, cosmetic materials, such as deodorants, perfumes, hair sprays, cleaners, and polishing agents as well as medicinal materials such as anti-asthma and anti-halitosis medications.

The present invention further relates to a process for producing aerosol products comprising the step of adding a hydrofluoroolefins and/or hydrochlorofluoroolefins with stabilizer combinations as described herein to active ingredients in an aerosol container, wherein said composition functions as a propellant.

4. Fire Fighting Agents:

A further embodiment provides methods of extinguishing or suppressing a fire in a total-flood application comprising providing an agent comprising a hydrofluoroolefins and/or hydrochlorofluoroolefins with stabilizer combinations of the present invention; disposing the agent in a pressurized discharge system; and discharging the agent into an area to extinguish or suppress fires in that area. Another embodiment provides methods of inerting an area to prevent a fire or explosion comprising providing an agent comprising a hydrofluoroolefins and/or hydrochlorofluoroolefins with stabilizer combinations of the present invention; disposing the agent in a pressurized discharge system; and discharging the agent into the area to prevent a fire or explosion from occurring.

The term "extinguishment" is usually used to denote complete elimination of a fire; whereas, "suppression" is often used to denote reduction, but not necessarily total elimination, of a fire or explosion. As used herein, terms "extinguishment" and "suppression" will be used interchangeably. There are four general types of halocarbon fire and explosion protection applications. (1) In total-flood fire extinguishment and/or suppression applications, the agent is discharged into a space to achieve a concentration sufficient to extinguish or suppress an existing fire. Total flooding use includes protection of enclosed, potentially occupied spaces such, as computer rooms as well as specialized, often unoccupied spaces such as aircraft engine nacelles and engine compartments in vehicles. (2) In streaming applications, the agent is applied directly onto a fire or into the region of a fire. This is usually accomplished using manually operated wheeled or portable units. A second method, included as a streaming application, uses a "localized" system, which discharges agent toward a fire from one or more fixed nozzles. Localized systems may be activated either manually or automatically. (3) In explosion suppression, a hydrofluoroolefins and/or hydrochlorofluoroolefins with stabilizer combinations of the present invention is discharged to suppress an explosion that has already been initiated. The term "suppression" is normally used in this application because the explosion is usually self-limiting. However, the use of this term does not necessarily imply that the explosion is not extinguished by the agent. In this application, a detector is usually used to detect an expanding fireball from an explosion, and the agent is discharged rapidly to suppress the explosion. Explosion suppression is used primarily, but not solely, in defense applications. (4) In inertion, a hydrofluoroolefins and/or hydrochlorofluoroolefins with stabilizer combinations of the present invention is discharged into a space to prevent an explosion or a fire from being initiated. Often, a system similar or identical to that used for total-flood fire extinguishment or suppression is used. Usually, the presence of a dangerous condition (for example, dangerous concentrations of flammable or explosive gases) is detected, and the hydrofluoroolefins and/or hydrochlorofluoroolefins with stabilizer combinations of the present invention is then discharged to prevent the explosion or fire from occurring until the condition can be remedied.

The extinguishing method can be carried out by introducing the composition into an enclosed area surrounding a fire. Any of the known methods of introduction can be utilized provided that appropriate quantities of the composition are metered into the enclosed area at appropriate intervals. For example, a composition can be introduced by streaming, e.g. using conventional portable (or fixed) fire extinguishing equipment; by misting; or by flooding, e.g., by releasing (using appropriate piping, valves, and controls) the composition into an enclosed area surrounding a fire. The composition can optionally be combined with an inert propellant, e.g., nitrogen, argon, decomposition products of glycidyl azide polymers or carbon dioxide, to increase the rate of discharge of the composition from the streaming or flooding equipment utilized.

Preferably, the extinguishing process involves introducing a hydrofluoroolefins and/or hydrochlorofluoroolefins with stabilizer combinations of the present invention to a fire or flame in an amount sufficient to extinguish the fire or flame. One skilled in this field will recognize that the amount of flame suppressant needed to extinguish a particular fire will depend upon the nature and extent of the hazard. When the flame suppressant is to be introduced by flooding, cup burner, test data is useful in determining the amount or concentration of flame suppressant required to extinguish a particular type and size of fire.

5. Solvent:

The ideal hydrochlorofluoroolefin and/or hydrofluoroolefin, suitable for solvent applications, should have a boiling point between about 10-60° C. The product should be chemically stable in contact with metals and resistant to swelling upon exposure to various plastic such as acrylonitrile butadiene styrene, PVC, polybutyelene tetraphathlate, polyethylene HD, polyethylene LD, polymethyle methacrylate, polyethylene, high impact polystyrene, polystyrene crystals, polystyrene 1160, polypropylene, polyamide 11, polycarbonate, polyvinylidene fluoride, polyetehrer block amide; or elastomeric material such as styrene butadiene 6510, ethylene propylene EP710, hydrogenated nitrile7DT1566, polychloroprene N658, polyacrylates DA 65, hyplalon DH70, fluorocarbon df, nitrile PB701, silicone SL1002, polyisoprene polybutadiene c6514, Teflon® 62945R.

EXAMPLES

Examples 1-4

Stability of 1234ze, 1233zd, 1243zf and F1233xf as a Blowing Agent in PUR Formulation Foam was made by small polyurethane dispenser consisting of two pressurized cylinders, one for the A side methylene diphenyl diisocyanate (MDI) and one for the B side (polyol mixtures). The pressure in the cylinders could be adjusted by regulators. The B-side mixtures were pre-blended and then charged into the pressurized cylinders. The blowing agents were then added into B-side cylinder and mixed thoroughly. The cylinders were connected to a dispensing gun equipped with a static mixer. The pressures of both cylinders were adjusted so that desired ratio of the A and B sides could be achieved. The formulations tested (all had an Iso Index of 110) contained Rubinate M, a polymeric methylene diphenyl diisocyanate (MDI) available from Huntsman; Jeffol SG-360 and R-425-X, polyols from Huntsman; TEAP-265, a polyol from Carpenter Company; Tegostab B 8465 a surfactant available from Evonik-Degussa; Jeffcat TD33A and ZR-70, catalysts available from Huntsman; NP 9.5, a compatibilizer available from Huntsman. The total blowing agent level was 26.0 mls/g. Table 1 summarizes the formulations of the study.

TABLE 1

B side and A side combinations used in making PUR foam.

| Formulation (wt %) | Example 1 | Example 2 | Example 3 | Example 4 |
|---|---|---|---|---|
| Jeffol SG-360 | 15.10 | 15.45 | 14.77 | 14.77 |
| Jeffol R-425-X | 4.31 | 4.41 | 4.22 | 4.22 |
| TEAP-265 | 8.63 | 8.83 | 8.44 | 8.44 |
| DEG | 2.16 | 2.21 | 2.11 | 2.11 |
| Jeffcat TD33A | 0.23 | 0.23 | 0.23 | 0.23 |
| Jeffcat ZR70 | 0.23 | 0.23 | 0.23 | 0.23 |
| NP 0.5 | 6.50 | 6.50 | 6.50 | 6.50 |
| Water | 0.42 | 0.42 | 0.42 | 0.42 |
| HFO-1234ze | 10.57 | 0 | 0 | 0 |
| HFO-1243zf | 0 | 8.92 | 0 | 0 |
| HCFO-1223zd | 0 | 0 | 12.11 | 0 |
| HCFO-1233xf | 0 | 0 | 0 | 12.11 |
| Rubinate M | 50.95 | 51.89 | 50.08 | 50.08 |
| A/B | 1.04 | 1.08 | 1.02 | 1.06 |

The cell gases of the foams made using set out in Table 1, were analyzed by crushing a piece the foam inside a gas tight syringe and analyzing the gas. The results are summarized in Table 2.

TABLE 2

Foam Gas Analysis

| % Blowing | Example 1 | | Example 2 | | Example 3 | | Example 4 | |
|---|---|---|---|---|---|---|---|---|
| agents | Before[1] | After[2] | Before | After | Before | After | Before | After |
| 1234ze | 99.96% | 99.66% | | | 5090 | 4014 | 138 | 13.7 |
| 1233zd | | | | | 99.2% | 99.2% | 20 | |
| 1243zf | | | 99.96% | 99.91% | | | 173 | |
| 1233xf | | | | | | | 99.95% | 99.95% |
| Trifluoropropyne | | | | | | 27.5 | | 43.5 |
| SiMe2F2 | | 2336 | | 0 | | 6 | | 0 |
| SiMe3F | | 239 | | 63 | | 0 | | 0 |
| others | | | | 0.04 | | | | |

[1]Indicate the % purity of starting material. Product may contains other impurities expressed in PPM

[2]Indicate the % purity of the starting material after making foam.

The data in Table 2 shows that 1234ze underwent significant degradation during the process of making PUR foam. The level of degradation is approximately 2336 ppm as shown by the formation of difluorodimethylsilane and fluorotrimethylsilane. The presence of these co-products, results from the elimination of HF and with the formation of trifluoropropyne. The HF produced in the process reacts with the silicone surfactant, present in the B side formulation, to produce the two silane products, difluorodimethylsilane and fluorotrimethylsilane.

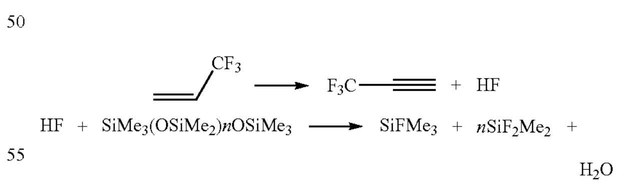

The data in table 2 shows that 1234ze is more unstable than 1233zd and 1243zf during the process of making PUR foam. This is also confirmed by data in Example 3, which shows that only the 5090 ppm level of 1234ze impurity in the 1233zd was decreased to 4041 ppm of. This decrease appeared as 27.5 of trifluoropropyne. Also, in the case of 1233xf, only the 138 ppm of 1234ze was decreased to 13.7 ppm. This decrease appeared as 43.5 ppm of trifluoropropyne.

Example 5

Stability of 1234ze in PUR Foam

Example 2 could be repeated with the addition of 200 ppm of the various stabilizers listed in Table 3 to the B side formulation and HFO 1234ze used as a foam blowing agent. Table 3 summarizes the expected formation of the silane co-products, which would evidence the degradation of the 1234ze.

TABLE 3

| Effect of Stabilizers on PUR Foam and HFO 1234ze Blowing Agent | |
|---|---|
| Stabilizer (200 ppm) | Silane Co-Products (ppm) |
| None | 2500 |
| α-methylstyrene | <<100 |
| Nitromethane | <<100 |
| 1,2-epoxybutane | <<100 |
| Glycidyl methyl ether | <<100 |
| isoprene | <<200 |

The data would be expected to show that the level of degradation was substantially decreased from 2500 ppm of $SiF_2Me_2$ and $SIFMe_3$ to much less than 100 ppm of the silane compounds.

Example 6-7

Stability of 1243zf and 1234ze in Polystyrene Foam (XPS)

The stability of these blowing agents was investigated in an autoclave in the presence of polystyrene beads and other additives which mimic the process of making XPS foam.

To an autoclave was added: general purpose polystyrene resin (MFI=11.0 g/10 min), talc concentrate (50% talc in polystyrene), water and flame retardant (tris (2-chloroethyl) phosphate). The autoclave was then sealed and loaded with the hydrofluoroolefin to be tested. One “blank” was run with no hydrofluoroolefin addition and overpressured to 30 psig with nitrogen to permit sampling of the vapor space following aging. Table 4 summarizes the formulations tested using 1243zf (example 6) and 1234ze (example 7) as blowing agents. The vapor phase in the autoclave was analyzed via gas chromatograph after aging for 24 hours at 140° C. Table 5 summarizes the results of the aging testing.

TABLE 4

| Formulations of the HFO 1234zf and 1234ze in XPS[1] | | | | | | |
|---|---|---|---|---|---|---|
| Example | Poly-styrene (grams) | Talc (grams) | Water (grams) | Flame Retardant (grams) | 1234xf (grams) | 1234ze (grams) |
| Blank | 73.51 | 3.01 | 1.54 | 1.52 | 0 | 0 |
| HFO1243zf | 73.52 | 3.01 | 1.51 | 1.52 | 8 | 0 |
| HFO1234ze | 73.51 | 3.01 | 1.51 | 1.50 | 0 | 10 |

TABLE 5

| Vapor Analysis | | | | |
|---|---|---|---|---|
| | HFO-1243zf | | HFO-1234ze | |
| | Original | After Aging | Original | After Aging |
| HFO | 99.96 | 99.96 | 99.963 | 99.533 |
| 3,3,3-trifluoropropyne | / | / | 0.028 | 0.233 |
| HFC-245fa | / | / | 0 | 0.097 |

The vapor analysis of example 5 using HFO 1243zf showed no significant difference in the vapor composition before or after aging, and the HFO 1243zf purity remained at 99.96%.

Table 5 shows the vapor analysis of example 6, where the 3,3,3-trifluoropropyne and HFC-245fa are evolved through the dehydrofluorination and hydrofluorination of HFO-1234ze respectively.

Example 8

Effect of Stabilizers on 1234ze Degradation in XPS Foams

Example 7 with 1234ze could be repeated in the presence of 200 ppm of various stabilizers. The level of degradation would be expected to be significantly reduced as evidenced by a reduction in formation of trifluoropropyne from approximately 2300 ppm to much less than 100 ppm. Table 7 summarizes expected results.

TABLE 7

| Effect of inhibitors on the stabilizations of 1234ze in the XPS formulations | |
|---|---|
| Stabilizer (200 ppm) | Trifluoropropyne |
| None | 2300 |
| α-methylstyrene | <<100 |
| Nitromethane | <<100 |
| 1,2-epoxybutane | <<100 |
| Glycidyl methyl ether | <<100 |
| isoprene | <<200 |

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A combination comprising a polyol and the hydrofluoroolefin HFO-1234ze and/or the hydrochlorofluoroolefin 1233zd and a stabilizer selected from the group consisting of d,1-limonene, d,1-limonene oxide, epoxbutane and combinations thereof wherein said combination is stable during use, handling and storage.

2. The combination of claim 1 wherein said stabilizer is present in an amount of from 1 to 50,000 ppm.

3. The combination of claim 1 wherein said stabilizer is present in an amount of from 100 to 1,000 ppm.

4. A heat transfer fluid composition comprising a polyol and the hydrofluoroolefin HFO-1234ze and/or the hydrochlorofluoroolefin 1233zd and a stabilizer selected from, d,1- limonene, d,1-limonene oxide, epoxybutane and or combinations thereof wherein said combination is stable during use, handling and storage.

5. The composition of claim 4 wherein said stabilizer is present in an amount of from 1 to 50,000 ppm.

6. The composition of claim 4 wherein said stabilizer is present in an amount of from 100 to 1,000 ppm.

* * * * *